United States Patent
Song et al.

(10) Patent No.: US 9,927,025 B2
(45) Date of Patent: Mar. 27, 2018

(54) METHOD AND SYSTEM FOR PREVENTING MISOPERATION OF SHIFT LEVER

(71) Applicants: Hyundai Motor Company, Seoul (KR); Kia Motors Corporation, Seoul (KR)

(72) Inventors: Ki Young Song, Seoul (KR); Chang Hyun Lee, Seoul (KR); Ean Soo Cho, Gyeonggi-Do (KR); Han Gil Park, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 85 days.

(21) Appl. No.: 15/132,427

(22) Filed: Apr. 19, 2016

(65) Prior Publication Data

US 2017/0167604 A1 Jun. 15, 2017

(30) Foreign Application Priority Data

Dec. 11, 2015 (KR) .......................... 10-2015-0177164

(51) Int. Cl.
| | | |
|---|---|---|
| *F16H 61/18* | (2006.01) |
| *F16H 61/02* | (2006.01) |
| *F16H 61/16* | (2006.01) |
| *F16H 59/04* | (2006.01) |
| *F16H 59/02* | (2006.01) |
| *F16H 59/10* | (2006.01) |
| *F16H 59/08* | (2006.01) |

(52) U.S. Cl.
CPC .......... *F16H 61/18* (2013.01); *F16H 59/0204* (2013.01); *F16H 59/0278* (2013.01);
(Continued)

(58) Field of Classification Search
CPC ...... F16H 61/18; F16H 61/0297; F16H 61/16; F16H 61/0248; F16H 59/0204;
(Continued)

(56) References Cited

U.S. PATENT DOCUMENTS 4,815,341 A * 3/1989 Ohkubo .................. F16H 61/12
477/134
6,347,270 B1 * 2/2002 Takizawa ................ F16H 61/16
701/53
(Continued)

FOREIGN PATENT DOCUMENTS

JP 06-074318 A 3/1994
JP H10-100719 A 4/1998
(Continued)

OTHER PUBLICATIONS

Espacenet translation of JP 2009 132168 A, Mizuta et al, Jun. 18, 2009, 12 pages.*

*Primary Examiner* — Dale W Hilgendorf
(74) *Attorney, Agent, or Firm* — Mintz Levin Cohn Ferris Glovsky and Popeo, P.C.; Peter F. Corless

(57) ABSTRACT

A control method and system for preventing misoperation of a shift lever of a vehicle are provided. In particular, when a driver manipulates the shift lever to select an automatic transmission mode or a manual transmission mode, shifting into an unintended mode attributable to misoperation is prevented. Therefore, the control method and system improve reliability in manipulating the shift lever and provide a safe driving environment to a driver.

14 Claims, 6 Drawing Sheets

(52) U.S. Cl.
CPC ......... *F16H 59/044* (2013.01); *F16H 59/105* (2013.01); *F16H 61/0248* (2013.01); *F16H 61/0297* (2013.01); *F16H 61/16* (2013.01); *B60Y 2300/182* (2013.01); *F16H 2059/0221* (2013.01); *F16H 2059/0282* (2013.01); *F16H 2059/082* (2013.01); *F16H 2061/185* (2013.01); *F16H 2302/04* (2013.01)

(58) Field of Classification Search
CPC .. F16H 59/0278; F16H 59/044; F16H 59/105; F16H 2061/185; F16H 2059/082; F16H 2059/0282
See application file for complete search history.

(56) References Cited

U.S. PATENT DOCUMENTS

| | | | |
|---|---|---|---|
| 6,401,564 B1 * | 6/2002 | Lee | F16H 59/0204 74/96 |
| 6,659,900 B2 * | 12/2003 | Nagasaka | F16H 61/18 475/132 |
| 8,301,348 B2 * | 10/2012 | Nagashima | F16H 61/18 701/59 |
| 8,571,770 B2 * | 10/2013 | Wakamatsu | F16H 61/18 701/51 |
| 8,600,635 B2 * | 12/2013 | Wakita | F16H 59/0204 701/54 |
| 2002/0026846 A1 * | 3/2002 | Lee | F16H 59/0204 74/473.18 |

FOREIGN PATENT DOCUMENTS

| | | | |
|---|---|---|---|
| JP | 2000-104814 A | | 4/2000 |
| JP | 2009132168 A | * | 6/2009 |
| KR | 10-0517710 B1 | | 9/2005 |
| KR | 10-2007-0038267 A | | 4/2007 |
| KR | 10-2007-0049728 A | | 5/2007 |
| KR | 10-2012-0056028 A | | 6/2012 |
| KR | 10-1204582 B1 | | 11/2012 |

* cited by examiner

METHOD AND SYSTEM FOR PREVENTING MISOPERATION OF SHIFT LEVER

CROSS REFERENCE TO RELATED APPLICATION

The present application claims priority to Korean Patent Application No. 10-2015-0177164, filed Dec. 11, 2015, the entire contents of which is incorporated herein for all purposes by this reference.

BACKGROUND

Field of the Invention

The present invention generally relates to a method and system for preventing misoperation of a shift lever, and more particularly, to a method and system that prevent misoperation of a shift lever when an automatic transmission mode is switched to a manual transmission mode.

Description of the Related Art

Generally, a vehicle transmission delivers driving power of an engine to a driving wheel. A vehicle transmission is categorized into a manual transmission which allows a driver to select a shift range, an automatic transmission which enables automatic shifting based on the driving condition of a vehicle, and a continuously variable transmission which performs continuous shifting without a specific number of gears.

Particularly, the automatic transmission is a device that automatically changes a gear ratio based on the driving state while a vehicle is being driven. The automatic transmission may provide driving convenience by reducing the burden of shifting and improve ride quality by providing smooth starting, acceleration, and deceleration. In a vehicle having such an automatic transmission, a shift lever is installed that enables a driver to change a transmission mode based on the driving condition. Accordingly, the driver may manipulate the shift lever to select a parking range (P), a reverse range (R), a neutral range (N), or a drive range (D) based on the driving condition. Additionally, to reflect a driver shift intention, a manual transmission range (M) in which shifting is performed by a driver is provided.

Generally, a vehicle having an automatic transmission is configured to allow shifting into an M range after passing through the D range. In particular, when a driver manipulates a shift lever to shift into the D range, there may be a misoperation (e.g., incorrect operation) in which the shift lever passes through a D range position and is moved to an M range position due to unintended manipulation. Additionally, while a vehicle is being driven in the M range, a shift lever may be manipulated due to reaction to a bumpy road or other travel disturbance. Accordingly, shifting into the D range may occur regardless of the driver's intention. In order words, a D range and an M range may be switchable in such a way that a driver manipulates a shift lever, but since the D range position and the M range position for a shift lever are proximate to each other, misoperation may occur.

The foregoing is intended merely to aid in the understanding of the background of the present invention, and is not intended to mean that the present invention falls within the purview of the related art that is already known to those skilled in the art.

SUMMARY

Accordingly, the present invention provides a method and system for preventing misoperation of a shift lever of a vehicle, which prevents shifting into an unintended transmission mode attributable to misoperation when a driver selects an automatic transmission mode or a manual transmission mode by manipulating the shift lever.

In order to achieve the above object, a control method for preventing misoperation of a shift lever of a vehicle according to the present invention may include: detecting whether shifting from a D range, which is an automatic transmission mode, into an M range, which is a manual transmission mode, is attempted by manipulation of the shift lever; and receiving information regarding whether a manual mode switch button is manipulated in response to determining that shifting from the D range to the M range is attempted, and to allow a shift range to be switched from the D range to the M range when receiving information indicating that the manual mode switch button is manipulated. A shift pattern according to the manipulation of the shift lever is R-N-D position, and a position of the shift lever may be restored to the N range when the shift lever is moved to the R range or the D range. When the shift lever is again moved to the D range in a state in which the D range is selected, the shift range may be switched to the M range.

The method may further include determining whether the shift lever is shifted from an N range, which is a neutral mode, or from a P range, which is a parking mode, to the D range and determining whether the shift lever maintains the D range for more than a preset period of time. The misoperation determination may include outputting a misoperation signal when the shift lever does not maintain the D range for more than the preset period of time, and the shift range may be prevented from being switched from the D range to the M range when the misoperation signal is input. When the misoperation signal is input, a warning message may be delivered to a driver, using a voice message or by illuminating a lamp.

Additionally, the shift range may be prevented from being switched from the D range to the M range when information indicating that the manual mode switch button is not manipulated is input when shifting from the D range to the M range is attempted. When the shift range is prevented from being switched from the D range to the M range, a warning message may be delivered to a driver. The manual mode switch button may be a P range release button disposed on the shift lever.

The method may further include determining whether shifting from the M range, which is the manual transmission mode, to the D range, which is the automatic transmission mode, is attempted, and receiving information regarding whether the manual mode switch button is manipulated in response to determining that shifting from the M range to the D range is attempted, to allow the shift range to be switched from the M range to the D range when information indicating that the manual mode switch button is manipulated is input.

The shift range may be prevented from being switched from the M range to the D range when information indicating that the manual mode switch button is not manipulated is input in response to determining that shifting from the M range to the D range is attempted. Additionally, the method may include switching the shift range from the M range to a P range, which is a parking mode, when an ignition of the vehicle is turned off in a state in which the shift range is the M range.

According to another aspect, a system for preventing misoperation of a shift lever of a vehicle according to the present invention may include: a manual mode switch button, disposed on a shift lever side, configured to output a signal when being manipulated; a position check module (e.g., a sensor) configured to determine a shift range based on a position of the shift lever; and a shifting controller configured to allow the shift range to be switched from a D range to an M range when a signal indicating that the shift lever is shifted from the D range to the M range is input by the position check module and when the signal is input as a result of manipulation of the manual mode switch button.

The shifting controller may include a misoperation check module configured to determine whether the shift lever maintains the D range for more than a preset period of time when the position check module determines that the shift lever is shifted from an N range or a P range to the D range, and the shifting controller may be configured to allow the shift range to be switched from the D range to the M range when information indicating that the shift lever maintains the D range for more than the preset period of time is input by the misoperation check module.

Furthermore, the shifting controller may be configured to prevent the shift range from being switched from the D range to the M range when information indicating that the shift lever does not maintain the D range for more than the preset period of time is input by the misoperation check module. When the shift lever does not maintain the D range for more than the preset period of time, the shifting controller may be configured to deliver a warning message to a driver using a voice message or by illuminating a lamp. The shifting controller may further be configured to prevent the shift range from being switched from the M range to the D range when a signal indicating that the shift lever is shifted from the M range to the D range is input by the position check module but a signal according to the manipulation of the manual mode switch button is not input. The shifting controller may be configured to switch the shift range from the M range to a P range, which is a parking mode, when an ignition of the vehicle is turned off in a state in which the shift range is the M range.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Figure 1:
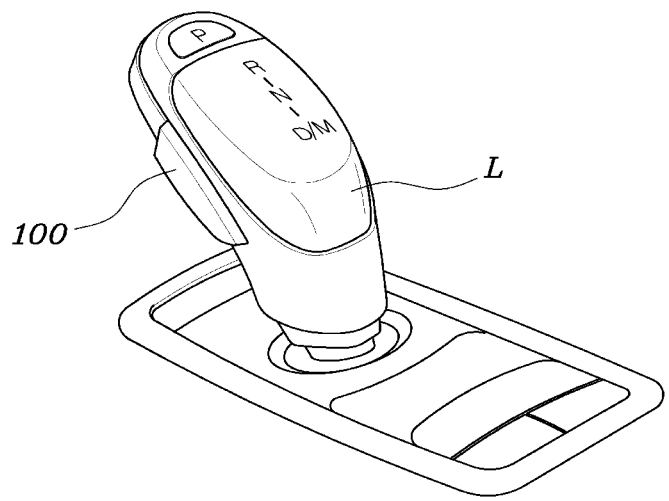
FIG. 1 is a view illustrating a shift lever of a vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinbelow, a method and system for preventing misoperation of a shift lever of a vehicle according to exemplary embodiments of the present invention will be described in detail with reference to the accompanying drawings.

Figure 2:
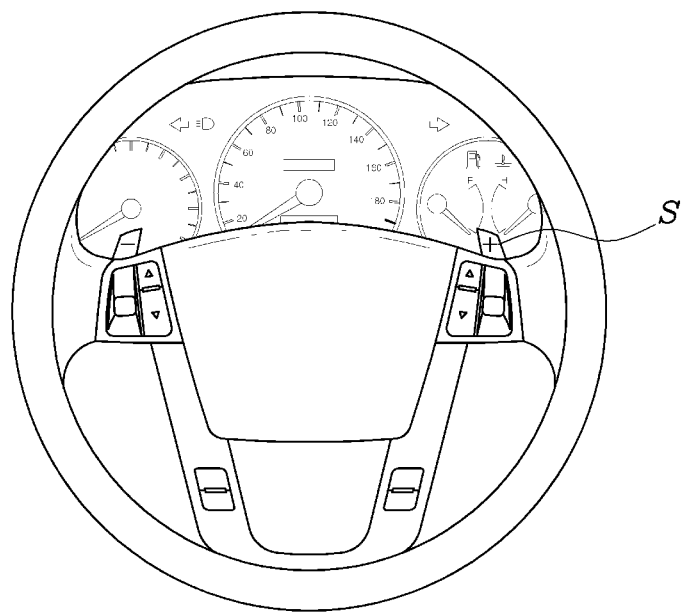
FIG. 2 is a view illustrating a paddle shifter applied to a steering wheel of a vehicle according to an exemplary embodiment of the present invention.
Figure 3:
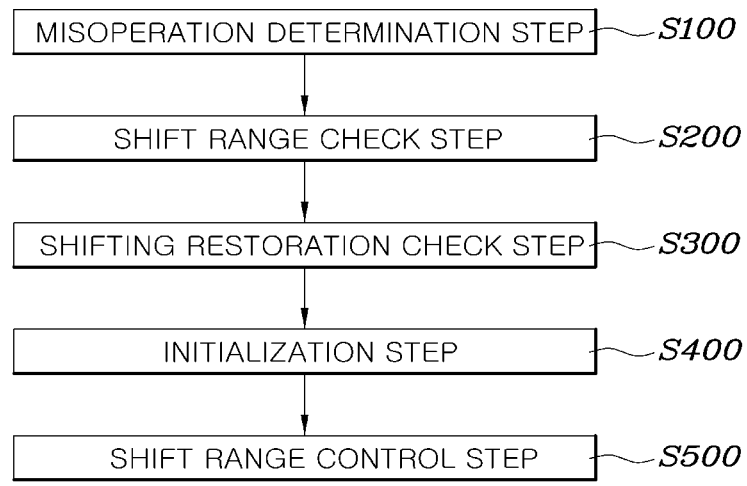
FIG. 3 is a flowchart of a method for preventing misoperation of a shift lever of a vehicle according to an exemplary embodiment of the present invention.
Figure 4:
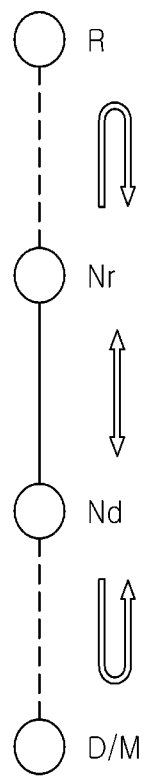
FIG. 4 is a view illustrating the shift pattern of a shift lever according to an exemplary embodiment of the present invention.
Figure 5:
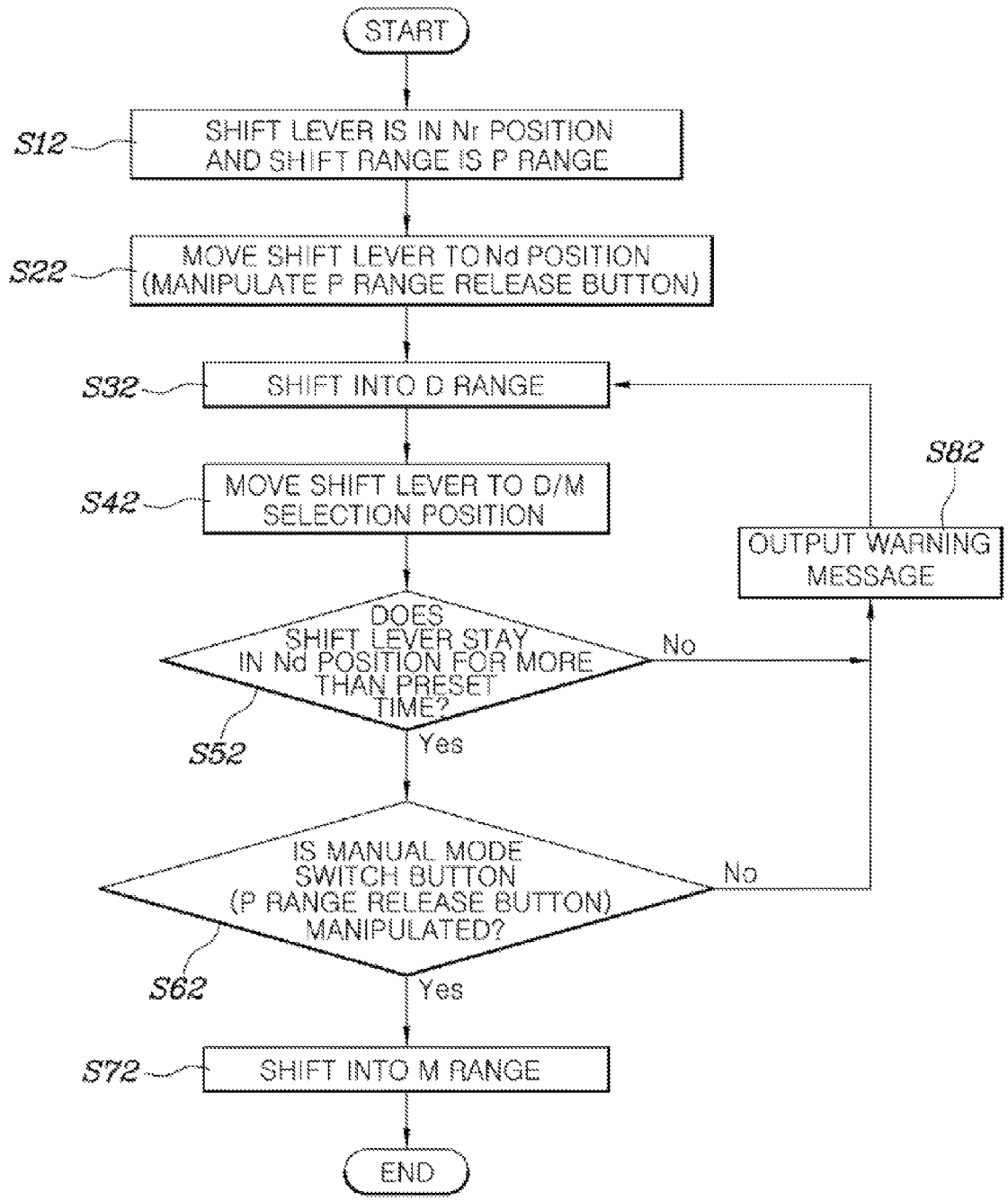
FIGS. 5 to 7 are flowcharts for various embodiments of a method for preventing misoperation of a shift lever according to an exemplary embodiment of the present invention.
Figure 6:
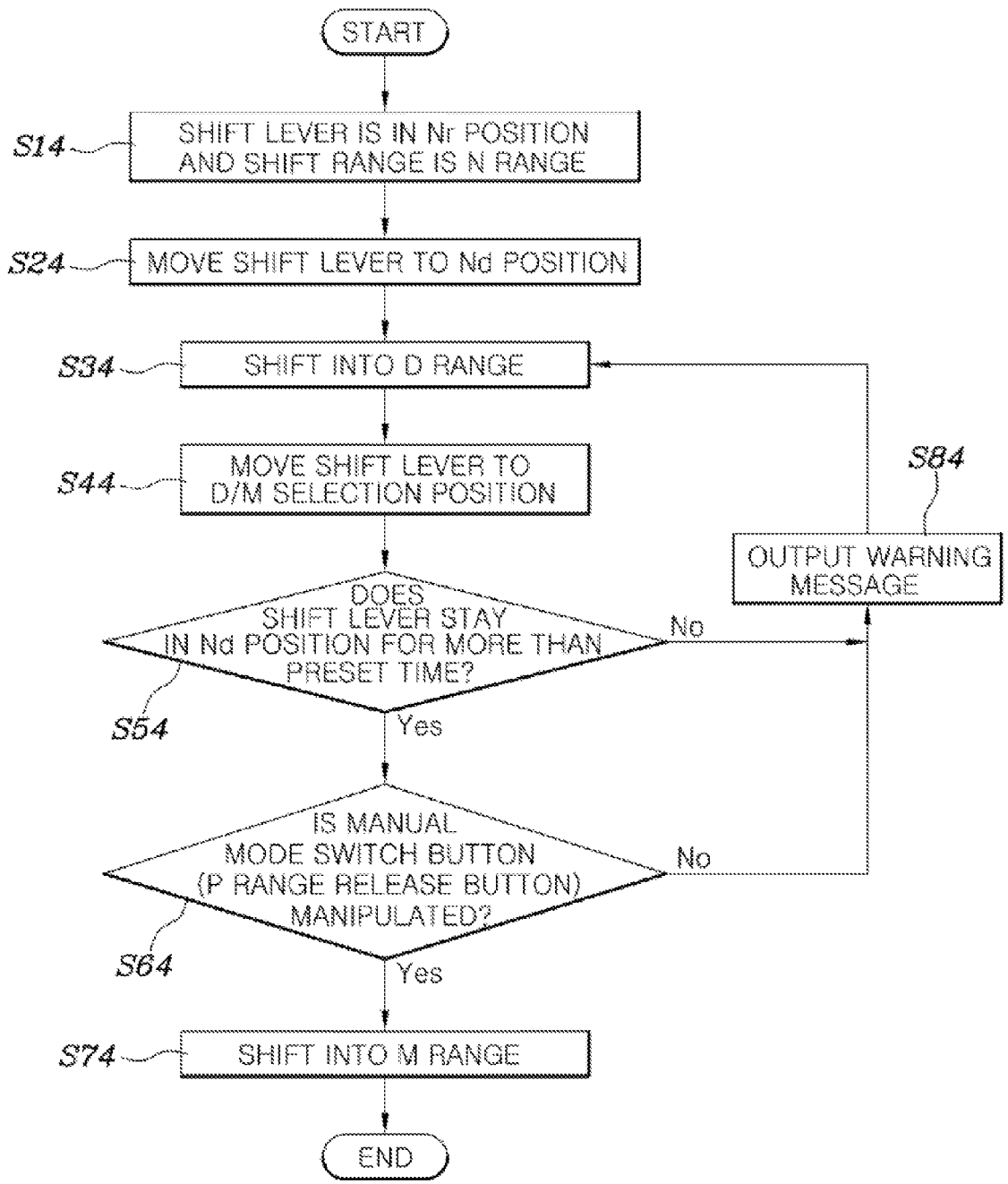
Figure 7:
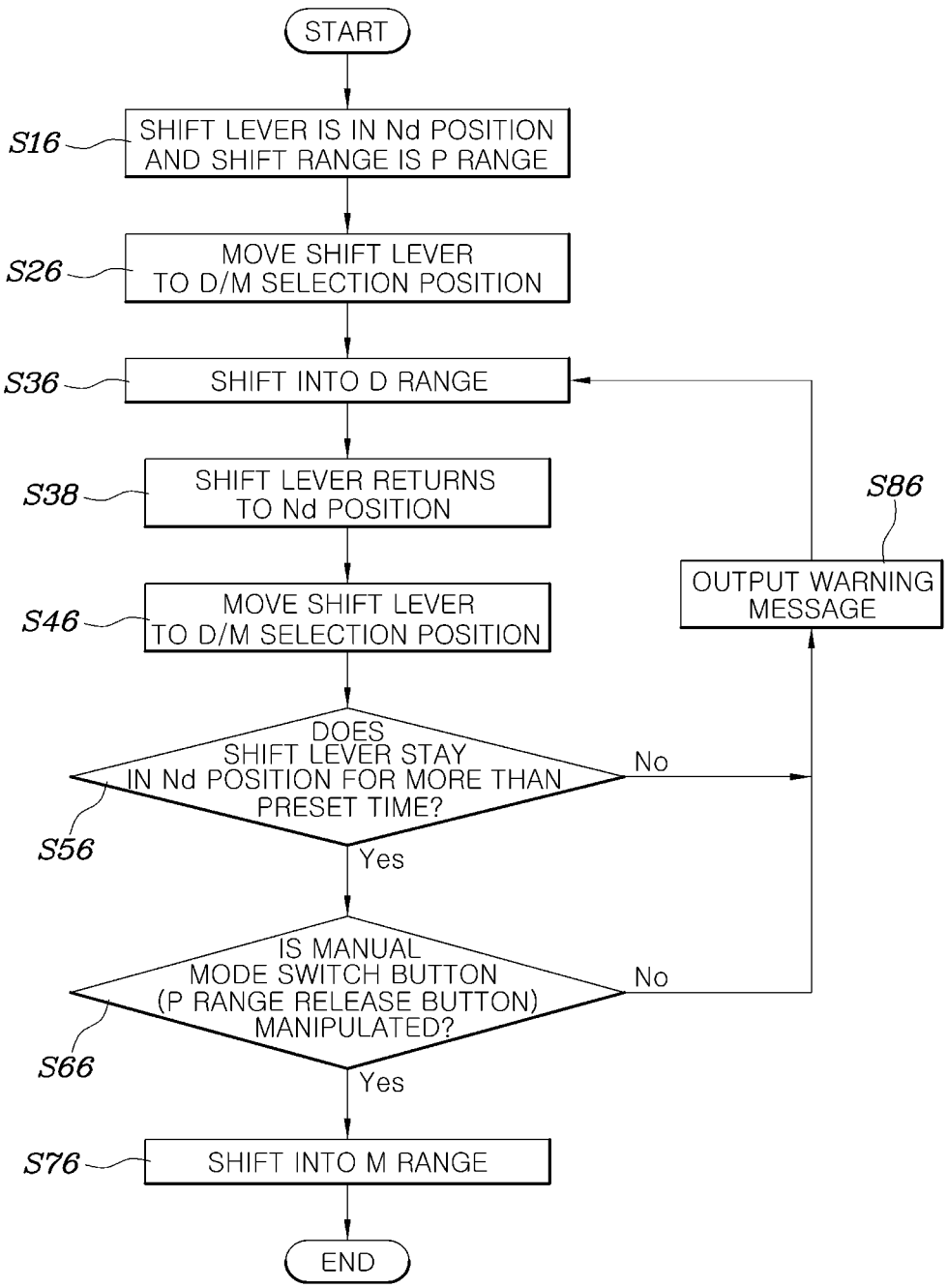
Figure 8:
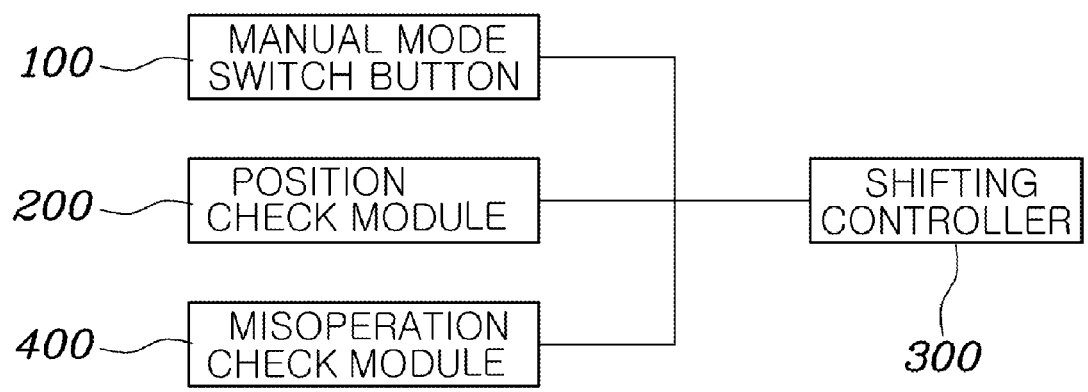
FIG. 8 is a block diagram of a system for preventing misoperation of a shift lever of a vehicle according to an exemplary embodiment of the present invention.

FIG. 1 is a view illustrating a shift lever of a vehicle, FIG. 2 is a view illustrating a paddle shifter applied to a steering wheel of a vehicle, and FIG. 3 is a flowchart of a method for preventing misoperation of a shift lever of a vehicle according to an exemplary embodiment of the present invention. Additionally, FIG. 4 is a view illustrating the shift pattern of a shift lever, FIGS. 5 to 7 are flowcharts for various exemplary embodiments of a method for preventing misoperation of a shift lever according to the present invention, and FIG. 8 is a block diagram of a system for preventing misoperation of a shift lever of a vehicle according to an exemplary embodiment of the present invention.

As illustrated in FIG. 1, in the present invention, a shift lever L, which is an electronic shift lever, may be manipulated to select one of an R range indicating reverse, an N range indicating neutral, a D range for an automatic transmission mode, and an M range for a manual transmission mode. When the M range is selected, shifting (+/−) may be performed by manipulating a paddle shifter S disposed on a steering wheel, as illustrated in FIG. 2. The present invention intends to prevent misoperation of a shift lever. Specifically, the present invention intends to prevent misoperation that may occur when an M range or a D range is selected by the manipulation of a shift lever.

In the present invention, the shift pattern according to the manipulation of a shift lever is R-N-D position, but is not limited thereto. Additionally, in the present invention the position of the shift lever may be restored to the N range when moved to an R or D range. When the shift lever is moved to the D range and the D range has been selected, the shift range may be switched from the D range to the M range.

The shift pattern of a common electronic shift lever is P-R-N-D range, and the shift lever L returns to the N range when the R range or the D range is selected. According to this configuration of the electronic shift lever, to select the M range for a manual transmission mode, the shift lever may necessarily first be moved to the D range. Further, the shift lever may be moved to the side or additional switches may be manipulated to select the M range. Therefore, it may be difficult to make full use of the characteristic of the electronic shift lever. The present invention may maintain the shift pattern of a shift lever as R-N-D. However, when the D range has been selected since the shift lever is moved from the N range to the D range and then returned to the N range, when the shift lever is moved to the D range again, the present invention may switch the shift range to the M range, to sufficiently make use of the characteristic of the electronic shift lever.

In addition, to return to the D range under the condition in which the M range is selected, it may be necessary to merely manipulate the shift lever L from the N range to the D range. Particularly, according to a control method for preventing misoperation of the shift lever L, which will be described later, when selecting the M range, even when the shift lever has a shift pattern in which shifting into the D range is attempted again in a state in which the D range has been selected, misoperation may be prevented. Additionally, the M range may be selected through a simplified structure.

As illustrated in FIG. 3, a control method for preventing misoperation of the shift lever of a vehicle according to the present invention may include: determining whether shifting from a D range, which is an automatic transmission mode, to an M range, which is a manual transmission mode, is attempted by manipulation of a shift lever (S200); receiving information regarding whether a manual mode switch button is manipulated in response to determining that shifting from the D range to the M range is attempted, and allowing shifting from the D range to the M range when information indicating that the manual mode switch button is manipulated is input (S500).

In the present invention, whether shifting from the D range, which is an automatic transmission mode, to the M range, which is a manual transmission mode, is attempted by manipulation of a shift lever may be determined. In particular, when the position of a shift range is determined, a controller may be configured to receive a signal regarding whether the manual mode switch button is manipulated, and allow the shift range to be switched from the D range to the M range in response to determining that the manual mode switch button is manipulated.

The manual mode switch button may be a P range release button disposed on the shift lever. In other words, to improve the convenience of manipulating the manual mode switch button, the P range release button may be used and may be utilized in conjunction with the manipulation of the shift lever. The P range release button may be used for control when shifting from the P range to another range, and generally may be installed proximate to the shift lever, but is not limited thereto. Therefore, the P range release button may be used as a manual mode switch button, whereby the shift lever may be conveniently manipulated when the manual mode switch button is manipulated. The manual mode switch button may be separately disposed on the steering wheel rather than using the P range release button, and the location thereof may be different based on the vehicle design.

In the conventional configuration, since switching from an automatic transmission mode to a manual transmission mode is performed only by moving a shift lever from a D range to an M range, misoperation may occur. However, the present invention determines whether a manual mode switch button is manipulated in addition to the manipulation of a shift lever. Therefore, driver's shifting intention may be correctly reflected and misoperation may be prevented, thus improving reliability.

The present invention may further include determining whether the shift lever is shifted from an N range, which is a neutral mode, or from a P range, which is a parking mode, to the D range and determining whether the shift lever maintains the D range for more than a preset period of time (S100). Generally, when a shift lever is manipulated for shifting into the M range, which is a manual transmission mode, the shift lever is required to pass through the D range, which is an automatic transmission mode. In particular, when a vehicle stops and the shift range is the N or P range, when shifting into the M range is performed rapidly, it may be determined that shifting is performed by incorrect manipulation of the shift lever. Accordingly, shifting into the M range, which is a manual transmission mode, may be prevented.

Accordingly, whether the shift lever is shifted to the D range in a state in which the N or P range is selected may first be determined, and then whether the shift lever maintains the D range for more than a preset period of time may be determined. In other words, when the shift range is switched to the M range after the shift lever maintains the D range for more than the preset period of time, the controller may be configured to determine that shifting is attempted by correct manipulation of the shift lever, and thus may allow shifting into the M range. Particularly, the preset time may be set at an initial design phase, and the value may be about 0.5 seconds.

In addition, when the shift lever does not maintain the D range for more than the preset period of time (e.g., the shift lever is in the D range for less than about 0.5 second), a misoperation signal may be output. Additionally, when the misoperation signal is input, the shift range may be prevented from being switched from the D range to the M range. In other words, when the shift lever is maintained in the D range for less than the preset period of time, the controller may be configured to determine that the shifting into the M range is due to the misoperation of the shift lever. Accordingly, the shift range may be prevented or restricted from being switched from the D range to the M range, whereby an accident attributable to the misoperation may be prevented.

Additionally, when the misoperation signal is input, a warning message may be delivered or transmitted to a driver, using a voice message, by illuminated a lamp, or the like (S500). In response to determining the misoperation of the shift lever, shifting from the D range to the M range may be prevented, and simultaneously, a voice message may be delivered to the driver to notify the driver of the prevention of shifting. Additionally, the message may be delivered by illuminated a lamp on the instrument cluster. Therefore, the driver may recognize the misoperation of the shift lever, and may be induced to perform normal shifting by correctly manipulating the shift lever.

Meanwhile, in response to determining that the shift lever is manipulated normally (e.g., no misoperation), whether the manual mode switch button is manipulated may be determined, whereby whether a driver intends to perform shifting from the D range to the M range may be correctly recognized. In other words, when the shift lever is shifted from the D range to the M range in a state in which the manual mode switch button is manipulated, the controller may be configured to determine that the driver intends to perform shifting into the M range. Therefore, shifting into the M range may be allowed.

Furthermore, when the shift lever is shifted from the D range to the M range in a state in which the manual mode switch button is not manipulated, the controller may be configured to determine that a driver incorrectly manipulated the shift lever or the shift lever unintentionally moved due to an external factor. Accordingly, shifting from the D range to the M range may be prevented or restricted. Additionally, a warning message may be delivered to a driver when the shift range is prevented from being switched from the D range to the M range. Particularly, the warning message may be transmitted in the form of a voice message or by illuminating a lamp in the instrument cluster.

The shift range control (S500) may further include determining whether shifting from the M range, which is a manual transmission mode, to the D range, which is an automatic transmission mode, is performed (S300). In response to determining that shifting from the M range to the D range is performed, the controller may be configured to receive information (e.g., from a sensor) regarding whether the manual mode switch button is manipulated, and may be configured to allow (e.g., permit) shifting from the M range to the D range when information indicating that the manual mode switch button is manipulated is input or received.

The above-described process allows the shift range to be restored to the D range from the M range to release the manual transmission mode. In other words, the controller may be configured to determine whether the shift range returns to the D range from the M range while a vehicle is being driven, and the shift range may be permitted to be switched from the M range to the D range when the manual mode switch button is manipulated when shifting from the M range to the D range is attempted. Accordingly, the driver's intention of shifting from the M range to the D range corresponding to an automatic transmission mode may be correctly reflected.

Moreover, in response to determining that the manual mode switch button is not manipulated when shifting from the M range to the D range is attempted, the shift range may be prevented from being switched from the M range to the D range, whereby incorrect shifting attributable to the misoperation of the shift lever may be prevented, thus improving reliability.

The shift range control (S500) may further include switching the shift range from the M range to the P range, which is a parking mode, when the ignition of a vehicle is turned off and the shift range is the M range (S400). In other words, a driver may not recognize that the last selected transmission mode is either an automatic transmission mode or a manual transmission mode when restarting a vehicle after the ignition of the vehicle is turned off. Accordingly, when the ignition of the vehicle is turned off, the shift range may be switched from the M range to the P range, which is a parking mode, whereby the driver may select a desired shift range by manipulating a shift lever when restarting the vehicle. Consequently, when the ignition of a vehicle is turned off, the shift range may be switched from the M range to the P range, whereby a driver may select a desired shift range when restarting a vehicle and thus correct shifting may be performed.

The above-described exemplary embodiment may be applied to an electronic shift lever. According to another exemplary embodiment of the present invention, the shift pattern of a shift lever is configured with an Nr position and an Nd position arranged in a line as the reference position of the shift lever, and an R position arranged in the forward direction (e.g., in front of) of the Nr position and a D/M is arranged in the backward direction (e.g., behind) of the Nd position, as illustrated in FIG. 4. Particularly, when the shift lever is moved to the R position or the D/M position, the shift lever may return to the Nr position or the Nd position.

Hereinafter, in the above-mentioned configuration, various exemplary embodiments of the present invention for switching to a manual transmission mode will be described. As illustrated in FIG. 5, in a first exemplary embodiment, when a shift lever is in the Nr position in a state in which the shift range is the P range (S12), the shift lever may be moved into the Nd position (S22) by pushing a P range release button, whereby shifting into the D range may be performed (S32). At this point, when the shift lever is moved in the backward direction to perform shifting into the M range (S42), whether the shift lever maintains the D range that corresponds to the Nd position for more than about 0.5 seconds, which is a preset period of time, may be determined by the controller (S52). When the shift lever remains in the Nd position for more than the preset period of time and the P range release button, which is a manual mode switch button, is manipulated (S62), shifting into the M range may be permitted and finally shifting into the M range may be performed (S72). When the shift lever does not remain in the Nd position for more than the preset period of time (e.g., remains in the Nd position for less than the preset period of time) or when the manual mode switch button is not manipulated when shifting into the M range is attempted, a warning message may be output (S82).

As illustrated in FIG. 6, in a second exemplary embodiment, when a shift lever is in the Nr position in a state in which the shift range is the N range (S14), the shift lever may be moved into the Nd position (S24), whereby shifting into the D range may be performed (S34). At this point, when the shift lever is moved in the backward direction to perform shifting into the M range (S44), whether the shift lever maintains the D range that corresponds to the Nd position for more than about 0.5 seconds, which is a preset period of time, may be determined (S54). When the shift lever remains in the Nd position for more than the preset period of time and the P range release button, which is a manual mode switch button, is manipulated (S64), shifting into the M range may be permitted and finally, shifting into the M range may be performed (S74). When the shift lever does not remain in the Nd position for the preset period of time (e.g., remains in the Nd position for less than the preset period of time) or when the manual mode switch button is not manipulated when shifting into the M range is attempted, a warning message may be output (S84).

As illustrated in FIG. 7, in a third exemplary embodiment, when a shift lever is in the Nd position in a state in which the shift range is the P range (S16), the shift lever may be moved into the D/M selection position (S26), whereby shifting into the D range may be performed (S36). At this point, the shift lever may return to the Nd position (S38), and then when the shift lever is moved in the backward direction to perform shifting into the M range (S46), whether the shift lever maintains the D range that corresponds to the Nd position for more than about 0.5 seconds, which is a preset period of time, may be determined (S56). When the shift lever remains in the Nd position for more than the preset period of time and the P range release button, which is a manual mode switch button, is manipulated (S66), shifting into the M range may be permitted, and finally, shifting into the M range may be performed (S76). When the shift lever does not remain in the Nd position for more than the preset period of time (e.g., remains in the Nd position for less than the preset period of time) or when the manual mode switch button is not manipulated when shifting into the M range is attempted, a warning message may be output (S86).

As described above, when shifting from the D range into the M range is performed, the above-mentioned processes enable shifting into the M range to be correctly performed according to the driver's intention. Additionally, safety accidents attributable to misoperation may be prevented, thus improving reliability.

Meanwhile, as illustrated in FIG. 8, a system for preventing misoperation of a shift lever of a vehicle may include: a manual mode switch button 100, disposed at the side of a shift lever L, and configured to output a signal when being manipulated; a position check module 200 configured to determine a shift range based on the position of the shift lever L; and a shifting controller 300 configured to allow a shift range to be switched from a D range to an M range when a signal indicating that the shift lever L is shifted from the D range to the M range is input by the position check module 200 and when a signal is input as a result of the manipulation of the manual mode switch button 100. In particular, the position check module 200 may be a sensor and may be operated by the controller 300.

In other words, the present invention may be configured to determine whether the shift lever is shifted from the D range, which is an automatic transmission mode, to the M range, which is a manual transmission mode, using the position check module 200. When the position of the shift range is determined by the position check module 200, the shifting controller 300 may be configured to receive a signal regarding the manipulation of the manual mode switch button 100. When shifting from the D range to the M range is attempted and the manual mode switch button 100 is manipulated, the shifting controller 300 may be configured to permit the shift range to be switched from the D range to the M range. Particularly, the manual mode switch button 100 may be a P range release button disposed on the shift lever. To improve the convenience of manipulating the manual mode switch button 100, the P range release button may be used and work in conjunction with the manipulation of the shift lever.

Meanwhile, the shifting controller may further include a misoperation check module 400 configured to determine whether the shift lever remains in the D range for more than a preset period of time (e.g., about 0.5 second) in response to determining that the shift lever is shifted from the N range or the P range to the D range. The misoperation check module 400 may be operated by the controller 300. In response to determining that the shift lever remains in the D range for more than preset period of time, the shifting controller 300 may be configured to permit the shift range to be switched from the D range to the M range. Additionally, in response to determining that the shift lever does not remain in the D range for more than preset period of time, the shifting controller 300 may be configured to prevent the shift range from being switched from the D range to the M range.

As described above, whether a shift lever is shifted to the D range in a state in which the N or P range is selected may be determined, and then whether the shift lever remains in the D range for more than the preset period of time may be determined. Accordingly, when both the requirements are satisfied, the controller 300 may be configured to determine that shifting is attempted by the correct manipulation of the shift lever, and shifting into the M range may be performed. In other words, when information indicating that the shift lever remains in the D range for more than preset period of time is input by the misoperation check module 400, the shifting controller 300 may be configured to permit the shift range to be switched from the D range to the M range. Conversely, when the shift lever does not remain in the D range for more than the preset period of time (e.g., remains in the D range for less than the preset period of time), the shifting controller 300 may be configured to prevent the shift range from being switched to prevent the misoperation of the shift lever. In particular, when the shift lever does not remain in the D range for more than the preset period of time, the shifting controller 300 may be configured to output a warning message to a driver, using a voice message or by illuminating on a lamp, whereby the driver may recognize the misoperation of the shift lever.

Furthermore, the shifting controller 300 may be configured to prevent the shift range from being switched from the M range to D range when a signal indicating that the shift lever is shifted from the M range to the D range is input and a signal according to the manipulation of the manual mode switch button 100 is not input. In other words, when the shift range is switched from the M range to the D range, whether the manual mode switch button 100 is manipulated may be determined. Therefore, incorrect shifting due to the misoperation by a driver may be prevented.

Meanwhile, when the ignition of a vehicle is turned off in a state in which the shift range is the M range, the shifting controller 300 may be configured to switch the shift range from the M range to the P range that is a parking mode. In other words, when restarting a vehicle after the ignition of a vehicle is turned off, since a driver may not recognize a current selected shift range, the shift lever may be manipulated to switch the shift range to the P range, thus preventing the misoperation of the shift lever.

According to the method and system for preventing the misoperation of a shift lever of a vehicle configured as described above, it may be possible to prevent shifting into an unintended transmission mode attributable to misoperation when a driver selects an automatic transmission or a manual transmission mode by manipulating the shift lever.

Therefore, when a shift lever is manipulated, reliability may be improved and a safe driving environment may be provided to a driver.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A control method for preventing misoperation of a shift lever of a vehicle, comprising:
   determining, by a controller, whether the shift lever is shifted from an N range, which is a neutral mode, or from a park (P) range, which is a parking mode, to a drive (D) range;
   determining, by the controller, whether the shift lever maintains the D range for more than a preset period of time;
   determining, by the controller, whether shifting from the D range, which is an automatic transmission mode, into a manual (M) range, which is a manual transmission mode, is attempted by manipulation of the shift lever;
   receiving, by the controller, information regarding whether a manual mode switch button is manipulated in response to determining that shifting from the D range to the M range is attempted;
   permitting, by the controller, a shift range to be switched from the D range to the M range in response to receiving information indicating that the manual mode switch button is manipulated;
   outputting, by the controller, a misoperation signal when the shift lever remains in the D range for less than the preset period of time; and
   preventing, by the controller, the shift range from being switched from the D range to the M range when the misoperation signal is output.

2. The control method of claim 1, wherein:
   a shift pattern according to the manipulation of the shift lever is reverse (R)-neutral (N)-D position;
   a position of the shift lever is restored to the N range when the shift lever is moved to the R range or the D range by a driver; and
   when the shift lever is moved to the D range from the N range again in a state in which the D range is selected, the shift range is switched to the M range.

3. The control method of claim 1, wherein when the misoperation signal is output, a warning message is delivered to a driver, using a voice message or by illuminating a lamp within the vehicle.

4. The control method of claim 1, further comprising:
   preventing, by the controller, the shift range from being switched from the D range to the M range when information indicating that the manual mode switch button is not manipulated is input when shifting from the D range to the M range is attempted.

5. The control method of claim 4, wherein when the shift range is prevented from being switched from the D range to the M range, a warning message is delivered to a driver.

6. The control method of claim 1, wherein the manual mode switch button is a P range release button disposed on the shift lever.

7. The control method of claim 1, further comprising:
   determining, by the controller, whether shifting from the M range, which is the manual transmission mode, to the D range, which is the automatic transmission mode, is attempted, and
   receiving, by the controller, information regarding whether the manual mode switch button is manipulated in response to determining that shifting from the M range to the D range is attempted, and
   permitting, by the controller, the shift range to be switched from the M range to the D range when information indicating that the manual mode switch button is manipulated is input.

8. The control method of claim 7, further comprising:
   preventing, by the controller, the shift range from being switched from the M range to the D range when information indicating that the manual mode switch button is not manipulated is input in response to determining that shifting from the M range to the D range is attempted.

9. The control method of claim 1, further comprising:
   switching, by the controller, the shift range from the M range to a park (P) range, which is a parking mode, when an ignition of the vehicle is turned off in a state in which the shift range is the M range.

10. A system for preventing misoperation of a shift lever of a vehicle, comprising:
    a manual mode switch button, disposed on a shift lever side, configured to output a signal when being manipulated;
    a position check module configured to determine a shift range based on a position of the shift lever; and
    a shifting controller configured to permit the shift range to be switched from a drive (D) range to a manual (M) range when a signal indicating that the shift lever is shifted from the D range to the M range is input by the position check module and when the signal is input as a result of manipulation of the manual mode switch button,
    wherein the shifting controller includes a misoperation check module configured to determine whether the shift lever remains in the D range for more than a preset period of time when the position check module determines that the shift lever is shifted from a neutral (N) range or a park (P) range to the D range, and
    wherein the shifting controller is configured to permit the shift range to be switched from the D range to the M range when information indicating that the shift lever maintains the D range for more than the preset period of time is input by the misoperation check module.

11. The system of claim 10, wherein the shifting controller is configured to prevent the shift range from being switched from the D range to the M range when information indicating that the shift lever remains in the D range for less than the preset period of time is input by the misoperation check module.

12. The system of claim 11, wherein when the shift lever remains in the D range for less than the preset period of time, the shifting controller is configured to transmit a warning message to a driver using a voice message or by illuminating a lamp within the vehicle.

13. The system of claim 10, wherein the shifting controller is configured to prevent the shift range from being switched from the M range to the D range when a signal indicating that the shift lever is shifted from the M range to the D range is input by the position check module and a signal according to the manipulation of the manual mode switch button is not input.

14. The system of claim 10, wherein the shifting controller is configured to switch the shift range from the M range to a park (P) range, which is a parking mode, when an ignition of the vehicle is turned off in a state in which the shift range is the M range.

* * * * *